United States Patent
Jia

(10) Patent No.: US 9,360,319 B2
(45) Date of Patent: Jun. 7, 2016

(54) MULTIPLE SENSE AXIS MEMS GYROSCOPE HAVING A SINGLE DRIVE MODE

(71) Applicant: FREESCALE SEMICONDUCTOR, INC., Austin, TX (US)

(72) Inventor: Kemiao Jia, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 358 days.

(21) Appl. No.: 14/019,066

(22) Filed: Sep. 5, 2013

(65) Prior Publication Data

US 2015/0059473 A1    Mar. 5, 2015

(51) Int. Cl.
*G01C 19/56*    (2012.01)
*G01C 19/5747*    (2012.01)

(52) U.S. Cl.
CPC ....... *G01C 19/5747* (2013.01); *Y10T 29/49117* (2015.01)

(58) Field of Classification Search
CPC .................................................. G01C 19/5747
USPC ....................................................... 73/504.12
See application file for complete search history.

(56) References Cited

U.S. PATENT DOCUMENTS

| | | | |
|---|---|---|---|
| 8,459,110 | B2 | 6/2013 | Cazzaniga et al. |
| 2010/0223996 | A1 | 9/2010 | Fukumoto |
| 2010/0263446 | A1 | 10/2010 | Tamura et al. |
| 2011/0154898 | A1* | 6/2011 | Cazzaniga ......... G01C 19/5747 73/504.12 |
| 2011/0303007 | A1 | 12/2011 | Rocchi |
| 2012/0055248 | A1 | 3/2012 | Hammer |
| 2012/0060604 | A1* | 3/2012 | Neul .................... G01C 19/574 73/504.12 |
| 2012/0291548 | A1* | 11/2012 | Kanemoto .......... G01C 19/574 73/504.12 |
| 2013/0031977 | A1 | 2/2013 | Kempe |
| 2013/0270659 | A1* | 10/2013 | Jomori ............... G01C 19/5747 257/417 |

FOREIGN PATENT DOCUMENTS

| | | |
|---|---|---|
| EP | 2339293 B1 | 6/2011 |
| JP | 2005241500 | 9/2005 |

OTHER PUBLICATIONS

Cui, et al., An Investigation of Decoupling Performance for a Novel Lateral Axis Gyroscope With Varying Environmental Parameters, Jun. 21-25, 2009, pp. 292-295, IEEE, Transducers 2009, Denver, CO, USA.
EP Application 14182582.8-1557, Extended European search report dated Feb. 2, 2015.

* cited by examiner

*Primary Examiner* — John Chapman, Jr.
(74) *Attorney, Agent, or Firm* — Charlene R. Jacobsen

(57) ABSTRACT

A gyroscope includes a first drive mass driven in a first drive motion along a first axis, the first drive motion generating a first sense motion of a first sense mass in response to rotation of the gyroscope. The gyroscope further includes a second drive mass driven in a second drive motion along a second axis that is transverse to the first axis. The second drive motion generates a second sense motion of a second sense mass in response to rotation of the gyroscope. A drive spring system interconnects the two drive masses to couple the first and second drive motions so that a single drive mode can be implemented. The sense motion of each sense mass is along a third axis, where the third axis is transverse to the other axes. The sense motion is translational motion such the sense masses remain parallel to the surface of the substrate.

19 Claims, 6 Drawing Sheets

MULTIPLE SENSE AXIS MEMS GYROSCOPE HAVING A SINGLE DRIVE MODE

TECHNICAL FIELD OF THE INVENTION

The present invention relates generally to microelectromechanical systems (MEMS) devices. More specifically, the present invention relates to a multiple sense axis MEMS gyroscope that is actuated using a single drive mode.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensor devices are widely used in applications such as automotive, inertial guidance systems, household appliances, game devices, protection systems for a variety of devices, and many other industrial, scientific, and engineering systems. One example of a MEMS sensor is a MEMS gyroscope, also known as an angular rate sensor. A gyroscope senses angular speed or velocity around one or more axes.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

DETAILED DESCRIPTION

Figure 1:
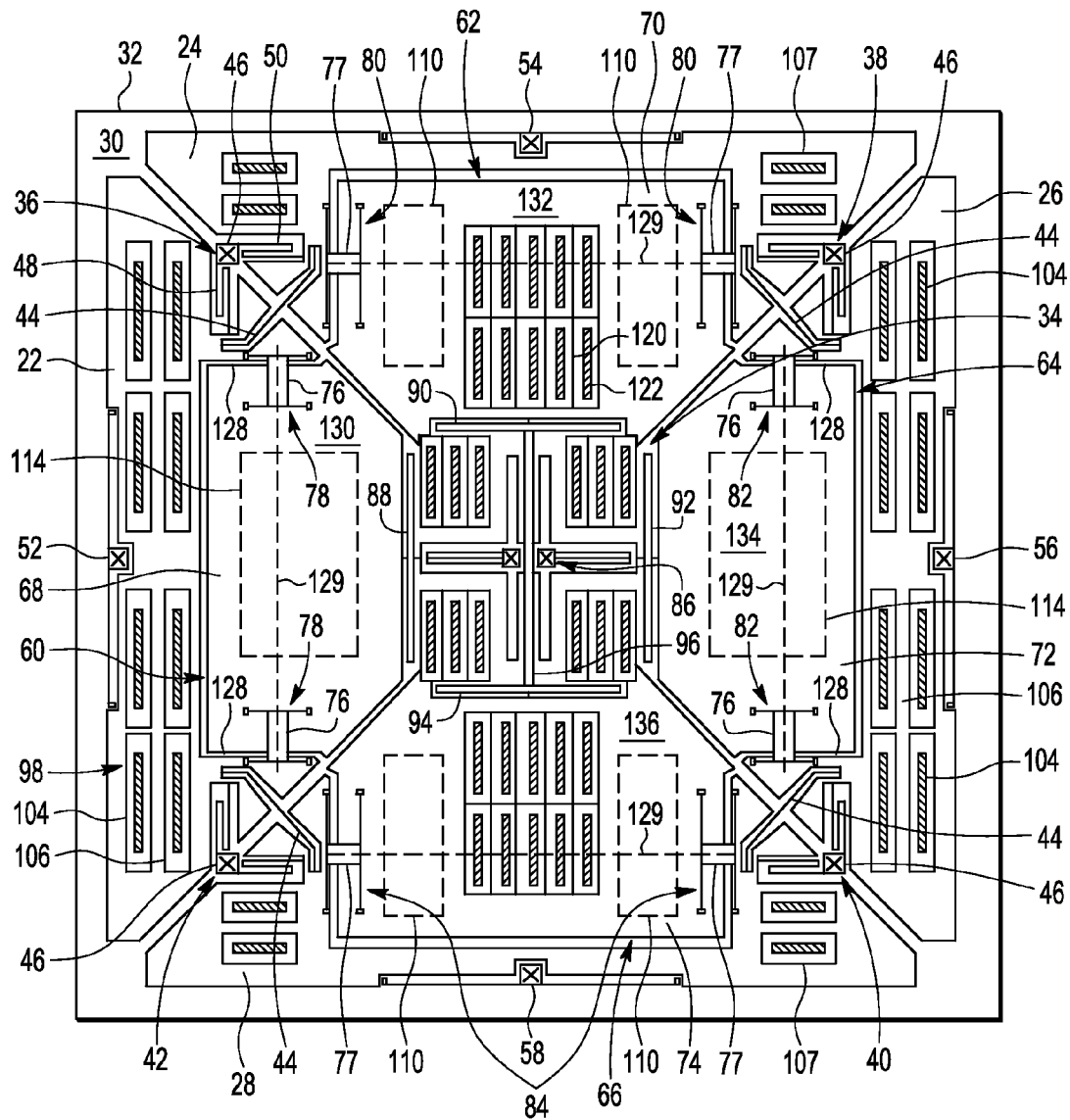
FIG. 1 shows a top view of a multiple sense axis microelectromechanical systems (MEMS) gyroscope in accordance with an embodiment.
Figure 1:
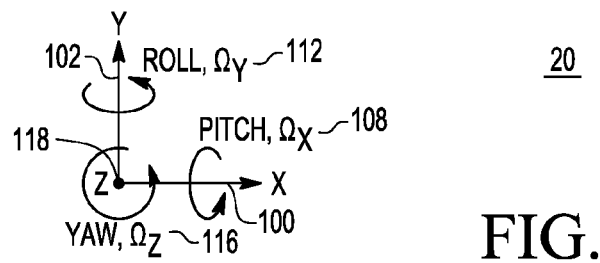

MEMS gyroscopes that are capable of sensing angular speed or velocity about multiple axes are highly desirable for implementation in a multiplicity of devices. MEMS gyroscopes typically exploit a Coriolis acceleration. That is, when rotation at an angular velocity (the value of which is to be sensed) is applied to a mobile sense mass that is being driven at a known drive velocity, the sense mass "feels" an apparent force, called the "Coriolis force." A Coriolis force of sufficient magnitude causes displacement of the mobile sense mass in a direction perpendicular to the direction of the drive velocity and in a direction perpendicular to the axis about which the rotation occurs. The displacement is proportional to the angular velocity of the rotation which may be detected as a change in capacitance.

MEMS gyroscopes include a drive system in order to impart a drive velocity upon the sense mass along a particular drive axis. In some configurations, drive electrodes, associated with a drive mass for the MEMS gyroscope, receive drive signals from an electronic drive circuit. The drive signals cause the drive mass to oscillate along the particular drive axis, which in turn causes the associated sense mass to oscillate. The sense mass will move in the sense direction when there is an angular rate stimulus, while continuing to oscillate along the drive axis.

The design and implementation of a MEMS gyroscope having multiple sense axis capability is particularly complex with regard to the micromechanical elements as well as the associated drive system. In particular, three drive systems and/or control loops may be needed to drive the drive masses of a three-axis (triaxial) sensing gyroscope. Unfortunately, the individual drive signals can result in movements of the individual elements of the MEMS gyroscope that mutually influence one another so that sense measurements of the gyroscope are not accurate. Furthermore, multiple control loops (one for each driving direction) entails a high occupation of area in an integrated, multiple sense axis configuration.

Embodiments entail a microelectromechanical systems (MEMS) gyroscope having a single drive mode design in a multiple sense axis configuration and a method for fabricating the MEMS gyroscope. The single drive mode can reduce the footprint for a multiple sense axis gyroscope. Additionally, the single drive mode can reduce the complexity of the associated application specific integrated circuit (ASIC) containing the electronic drive circuit to yield a lower power consumption and smaller ASIC design. Furthermore, the single drive mode design has intrinsically less damping which can yield high device performance with lower requirements on vacuum levels (lower bonding requirement, no getter, and so forth), therefore simplifying fabrication. The MEMS gyroscope implements the single drive mode combined with a drive spring system that reduces motion coupling between the functional elements to achieve a robust device that is less susceptible to external perturbations. The MEMS gyroscope also has more efficient sense capability which can increase the sensitivity of the device without increasing the device size.

FIG. 1 shows a top view of a multiple sense axis microelectromechanical systems (MEMS) gyroscope 20 in accordance with an embodiment. MEMS gyroscope 20 includes a structural configuration that enables a single drive mode and a number of elements enabling sensing of angular velocity about three mutually orthogonal axes.

MEMS gyroscope 20 includes drive frame that includes multiple drive masses 22, 24, 26, and 28 suspended above a surface 30 of a substrate 32 and uniformly arranged about a central region 34. MEMS gyroscope 20 further includes multiple drive spring systems 36, 38, 40, 42 interconnecting adjacent drive masses 22, 24, 26, and 28. More specifically, drive spring system 36 interconnects drive mass 22 with drive mass 24, drive spring system 38 interconnects drive mass 24 with drive mass 26, drive spring system 40 interconnects drive mass 26 with drive mass 28, and drive spring system 42 interconnects drive mass 28 with drive mass 22.

In an embodiment, each of drive spring systems 36, 38, 40, 42 includes a spring element 44 coupled to adjacent drive masses 22, 24, 26, and 28. By way of example, spring element 44 of drive spring system 36 is coupled to each of drive mass 22 and 24. Each of drive spring systems 36, 38, 40, and 42 further includes an anchor element 46 coupled to substrate 32, a spring element 48 interconnected between one of drive masses 22, 24, 26, and 28 and anchor element 46, and another spring element 50 interconnected between the adjacent one of drive masses 22, 24, 26, and 28 and anchor element 46. Again with regard to drive spring system 36, spring element 48 is interconnected between drive mass 22 and anchor element 46, and spring element 50 is interconnected between drive mass 24 and anchor element 46.

MEMS gyroscope 20 further includes spring anchorages 52, 54, 56, and 58. One each of spring anchorages 52, 54, 56, and 58 is coupled to a corresponding one each of drive masses 22, 24, 26, 28. Thus, each of drive masses 22, 24, 26, and 28 is spaced apart from, i.e., suspended above, surface 30 of substrate 32 by associated anchors. In an example, drive mass 22 is anchored to substrate 32 by anchor elements 46 of drive spring systems 36 and 42 and by spring anchorage 52. Likewise, drive mass 24 is anchored to substrate 32 by anchor elements 46 of drive spring systems 36 and 38 and by spring anchorage 54. Drive mass 26 is anchored to substrate 32 by anchor elements 46 of drive spring systems 38 and 40 and by spring anchorage 56, and drive mass 28 is anchored to substrate 32 by anchor elements 46 of drive spring systems 40 and 42 and by spring anchorage 58. Drive masses 22, 24, 26, 28 are suspended via drive spring systems 36, 38, 40, 42 and spring anchorages 52, 54, 56, 58 to enable in-plane movement of drive masses 22, 24, 26, 28 and very little out-of-plane movement of drive masses 22, 24, 26, 28. The anchors of MEMS gyroscope 20 are represented herein by an "X" enclosed by a box to represent the physical attachment of a particular element to surface 30 of substrate 32.

As illustrated in FIG. 1, each of drive masses 22, 24, 26, and 28 is approximately shaped like a "U" or like a "U" turned over or upside down, and thus having openings 60, 62, 64, and 66 that open toward central region 34. Sense masses 68, 70, 72, and 74 are arranged in openings 60, 62, 64, and 66, respectively, for sensing angular velocities when MEMS gyroscope is set in motion. Multiple beam springs 76, 77 couple sense masses 68, 70, 72, and 74 with their associated drive masses 22, 24, 26, and 28. In an embodiment, sense mass 68 is mechanically interconnected with drive mass 22 via a pair 78 of beam springs 76. Sense mass 70 is mechanically interconnected with drive mass 24 via a pair 80 of beam springs 77. Sense mass 72 is mechanically interconnected with drive mass 26 via a pair 82 of beam springs 76, and sense mass 74 is mechanically interconnected with drive mass 28 via a pair 84 of beam springs 77.

In general, pairs 78, 82 of beam springs 76 provide compliance for sense masses 68, 72 in the z-direction, i.e., parallel to z-axis 118. Pairs 80, 84 of beam springs 77 provide compliance for sense masses 70, 74 in both the z-direction and in the X-direction, i.e., parallel to X-axis 100. However, beam springs 76, 77 differ from drive spring systems 36, 38, 40, 42 in that beam springs 76, 77 provide rigid in-plane coupling between drive masses 22, 24, 26, 28 and their associated sense masses 68, 70, 72, 74. Conversely, drive spring systems 36, 38, 40, 42 are rigid in the out-of-plane direction, i.e., z-direction.

An anchor system 86 is located in central region 34 coupled to substrate 32 with sense masses 68, 70, 72, and 74 being arranged around anchor system 86. Compliant members 88, 90, 92, and 94 are also located in central region 34. Compliant member 88 is interconnected between sense mass 68 and anchor system 86 and compliant member 92 is interconnected between sense mass 72 and anchor system 86. Additionally, a substantially rigid beam 96 interconnects sense mass 70 with sense mass 74 via compliant members 90 and 94. That is, compliant member 90 is interconnected between sense mass 70 and one end of beam 96 and compliant member 94 is interconnected between sense mass 74 and the opposing end of beam 96. However, compliant members 90 and 94 are also indirectly interconnected to anchor system 86 via a hinge system (discussed in connection with FIG. 7).

MEMS gyroscope 20 further includes drive assemblies 98 associated with drive masses 22 and 26. As will be discussed in significantly greater detail below, drive assemblies 98 are configured to cause a drive motion along an X-axis 100 of a three-dimensional Cartesian coordinate system substantially parallel to surface 30 of substrate 32. Alternatively, similar drive assemblies (not shown) may be associated with drive masses 24 and 28 to cause the drive motion substantially parallel to surface 30 of substrate 32 along a Y-axis 102 of the Cartesian coordinate system.

Each drive assembly 98 includes fixed drive electrodes 104 that are fixed with respect to, i.e., coupled to, surface 30 of substrate 32, and movable drive electrodes 106 that are fixed with respect to, i.e. formed in, drive masses 22 and 26. The fixed and movable drive electrodes 104 and 106 may be arranged in a comb finger configuration and may be capacitively coupled to one another so as to generate a mutual attraction/repulsion to cause oscillatory drive motion of drive masses 22 and 26 along X-axis 100. Fixed drive electrodes 104 are shown with rightwardly and downwardly directed hatching to distinguish them from the surrounding elements of MEMS gyroscope 20. Additional sets of electrodes 107 may be formed in association with, for example drive masses 24 and 28 to provide feedback control for the drive motion. In alternative configurations, drive electrodes 104 may be associated with drive masses 24, 28 and feedback electrodes 107 may be associated with drive masses 22, 26. And in still other configurations, electrodes 104 and/or 107 may be evenly distributed among drive masses 22, 24, 26, 28.

MEMS gyroscope 20 additionally includes a plurality of sense electrodes. As mentioned above, MEMS gyroscope 20 is a triaxial gyroscope capable of sensing rotations around three axes. In an embodiment, MEMS gyroscope 20 is capable of sensing pitch angular velocity 108 (labeled $\Omega_X$ in FIG. 1), i.e., the rotation of MEMS gyroscope 20 about X-axis 100, via pitch sense electrodes 110. Pitch sense electrodes 110 can be plate electrodes formed on substrate 32 underlying sense masses 70 and 74. Pitch sense electrodes are obscured by sense masses 70 and 74 in FIG. 1 and are thus represented by dashed lines. MEMS gyroscope 20 is also capable of sensing roll angular velocity 112 (labeled $\Omega_Y$ in FIG. 1), i.e., the rotation of MEMS gyroscope 20 about Y-axis 102, via roll sense electrodes 114. Roll sense electrodes 114 can be plate electrodes formed on substrate 32 underlying sense masses 68 and 72. Roll sense electrodes 114 are obscured by sense masses 68 and 72 in FIG. 1 and are thus represented by dashed lines.

Furthermore, MEMS gyroscope 20 is capable of sensing yaw angular velocity 116 (labeled $\Omega_Z$ in FIG. 1), i.e., the rotation of MEMS gyroscope 20 about a Z-axis 118 perpendicular to surface 30 of substrate 32. In an embodiment, sense masses 70 and 74 are utilized to sense yaw angular velocity 116. As such, each of sense masses 70 and 74 includes movable yaw sense electrodes 120 which are capacitively coupled to respective fixed yaw sense electrodes 122. Fixed yaw sense electrodes 122 are shown with rightwardly and upwardly directed hatching to distinguish them from the surrounding elements of MEMS gyroscope 20.

The operation of MEMS gyroscope 20 including imposed drive motion and resulting sense motion in response to rotations of MEMS gyroscope 20 will be described below in connection with FIGS. 5-8.

Figure 2:
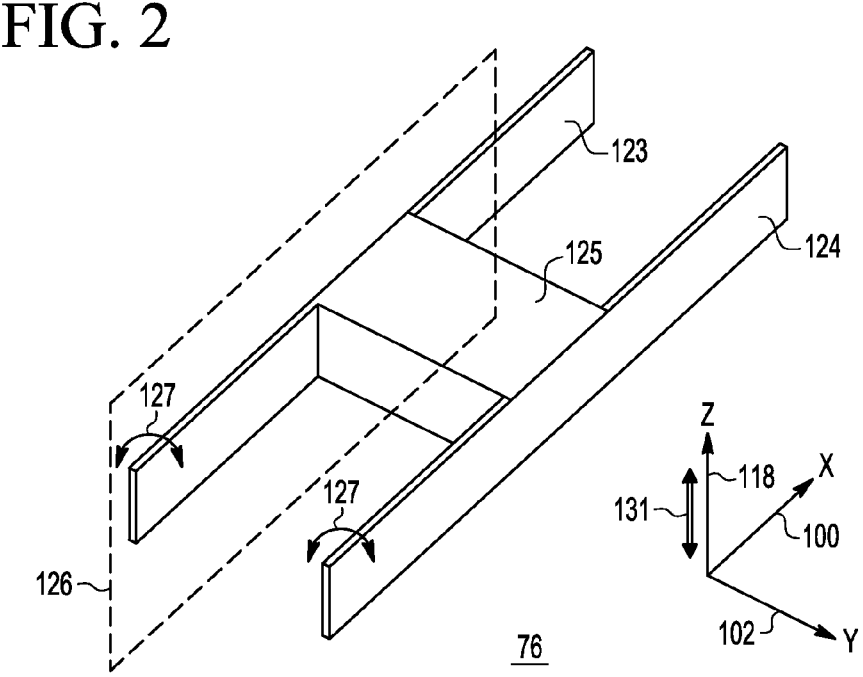
FIG. 2 shows a perspective view of a beam spring implemented in the MEMS gyroscope.
Figure 3:
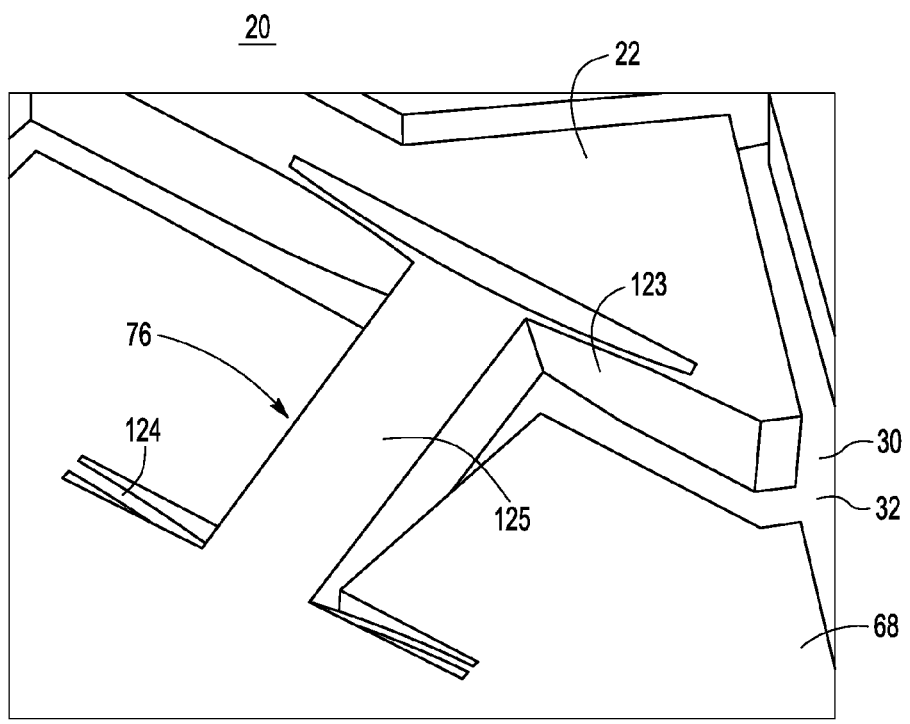
FIG. 3 shows a partial perspective view of the MEMS gyroscope including the beam spring.

Referring now to FIGS. 2 and 3, FIG. 2 shows a perspective view of one of beam springs 76 implemented in MEMS gyroscope 20 (FIG. 1), and FIG. 3 shows an enlarged partial perspective view of MEMS gyroscope 20 including actuation of beam spring 76. In this example, beam spring 76 will be discussed in connection with the interconnection of sense mass 68 to drive mass 22. However, the following description applies equivalently to any of beam springs 76, arranged as pairs 78, 82 (FIG. 1) of beam springs 76, that interconnect each of sense masses 68, 72 with its associated drive mass 22 and 26. Similarly, the following description applies equivalently to any of beam springs 77 arranged as pairs 80, 84 of beam springs 77 that interconnected each of sense masses 70, 74 with its associated drive mass 24, 28.

Beam spring 76 includes compliant ends 123 and 124, and a beam section 125 spanning between compliant ends 123 and 124. In the illustrated exemplary configuration shown in FIG. 3, compliant end 123 may be coupled to drive mass 22 and compliant end 124 may be coupled to sense mass 68. Each of compliant ends 123 and 124 is configured to deform, twist, or otherwise tilt, out of a plane 126 (represented in FIG. 2 by dashed lines) perpendicular to surface 30 of substrate 32, and beam section 125 is rigid relative to compliant ends 123 and 124. The tilt deformation of compliant ends 123 and 124 is represented in FIG. 2 by bi-directional arrows 127, and the tilt deformation of compliant ends 123 and 124 is visible in the enlarged partial perspective view of MEMS gyroscope 20 in FIG. 3. This tilt deformation of compliant ends 123 and 124 allows sense mass 68 to move relative to drive mass 22.

Referring back to FIG. 1 in connection with FIGS. 2 and 3, in an embodiment each of beam springs 76 of pair 78 are located on opposing edges 128 of sense mass 68 such that longitudinal axes 129 of beam sections 125 of pair 78 are aligned with one another. Likewise, each of beam springs 76 of pairs 80, 82, and 84 are located on opposing edges 128 of their corresponding sense masses 70, 72, and 74 such that longitudinal axes 129 of beam sections 125 of each pair 80, 82, and 84 of beam springs 76 are also aligned with one another.

The alignment and interconnection of pair 78 of beam springs 76 and compliant member 88 are balanced in accordance with the center of gravity of sense mass 68 such that a force (represented by an arrow 131 in FIG. 2) aligned with Z-axis 118 will cause sense mass 68 to move, or translate, along Z-axis 118 while remaining substantially parallel to surface 30 of substrate 32. That is, force 131 results in translational sense motion of sense mass 68 such that as sense mass 68 moves along Z-axis 118, while a planar surface 130 of sense mass 68 remains substantially parallel to the underlying surface 20. Similarly, pair 80 of beam springs 76 and compliant member 90 are balanced in accordance with the center of gravity of sense mass 70 such that a force aligned with Z-axis 118 will cause sense mass 70 to undergo translational sense motion, with its planar surface 132 remaining substantially parallel to surface 30 of substrate 32. Likewise, pair 82 of beam springs 76 and compliant member 92 are balanced to cause sense mass 72 to undergo translational sense motion with its planar surface 134 remaining substantially parallel to surface 30 of substrate 32, and pair 84 of beam springs 76 and compliant member 96 are balanced to cause sense mass 74 to undergo translational sense motion with its planar surface 136 remaining substantially parallel to surface 30 of substrate 32.

It should be recalled that pitch sense electrodes 110 underlie sense masses 70 and 74. Accordingly, as each of sense masses 70 and 74 undergoes translational sense motion along Z-axis 118, the displacement of sense masses 70 and 74 may be detected as a change in capacitance at pitch sense electrodes 110. Additionally, roll sense electrodes 114 underlie sense masses 68 and 72. Accordingly, as each of sense masses 68 and 72 undergoes translational sense motion along Z-axis 118, the displacement of sense masses 68 and 72 may be detected as a change in capacitance at roll sense electrodes 114.

Figure 4:
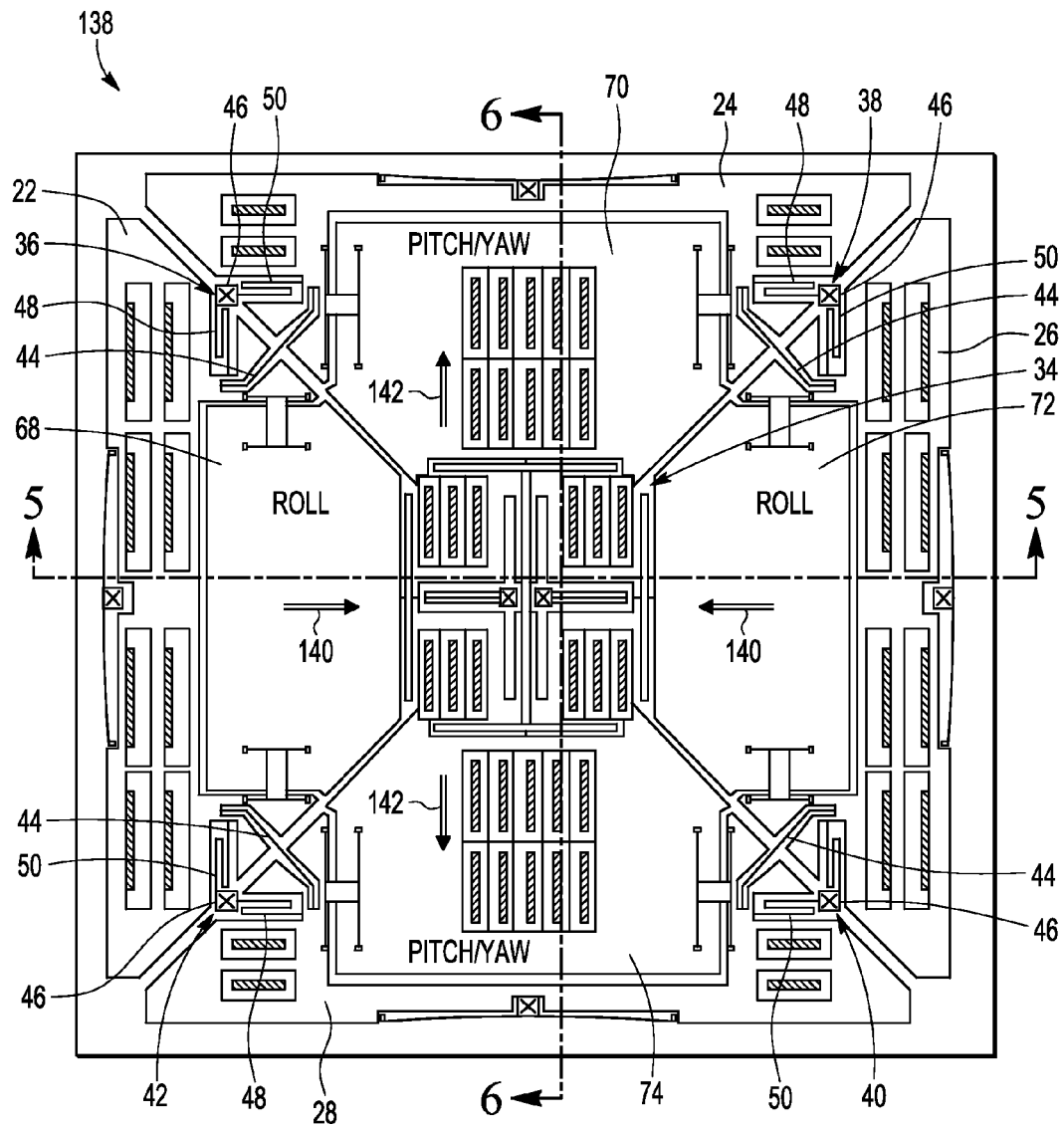
FIG. 4 shows a top view of the MEMS gyroscope exemplifying a drive mode of the device.

FIG. 4 shows a top view of MEMS gyroscope 20 exemplifying a drive mode 138 of MEMS gyroscope 20. In an embodiment, drive masses 22 and 26 are configured to be driven to have a drive motion, represented by arrows 140, along X-axis 100. That is, drive masses 22 and 26 are suitably elastically anchored to substrate 32 to move with translational linear drive motion 140 along X-axis 100. Sense masses 68 and 72 are mechanically coupled to respective drive masses 22 and 26 so as to be rigid with regard to the drive motion. Thus, sense masses 68 and 72 are carried along with drive masses 22 and 26 and are thus driven so as to have translational linear drive motion 140 along X-axis 100. Additionally, drive masses 22 and 26, together with sense masses 68 and 72, are driven to move in phase opposition with respect to one another. As will be discussed in connection with FIG. 5, sense masses 68 and 72 are used to sense roll angular velocity 112 of MEMS gyroscope 20 about Y-axis 102. Thus, each of sense masses 68 and 72 is labeled ROLL in FIG. 4 to emphasize their capability for sensing roll angular velocity 112.

Drive masses 24 and 28 are configured to be driven to have a drive motion, represented by arrows 142, along Y-axis 102. That is, drive masses 24 and 28 are suitably elastically anchored to substrate 32 to move with translational linear drive motion 142 along Y-axis 102. Sense masses 70 and 74 are mechanically coupled to respective drive masses 24 and 28 so as to be rigid with regard to the drive motion. Thus, sense masses 70 and 74 are carried along with drive masses 24 and 28 so as to have translational linear drive motion 142 along Y-axis 102. Additionally, drive masses 24 and 28, together with sense masses 70 and 74, are driven to move in phase opposition with respect to one another. As will be discussed in connection with FIG. 6, sense masses 70 and 74 are used to sense pitch angular velocity 108 of MEMS gyroscope 20 about X-axis 100. Furthermore, sense masses 70 and 74 are used to sense yaw angular velocity 116 of MEMS gyroscope 20 about Z-axis 116, as will be discussed in connection with FIG. 7. Thus, each of sense masses 70 and 74 is labeled PITCH/YAW in FIG. 4 to emphasize their capability for sensing pitch angular velocity 108 and yaw angular velocity 116.

In accordance with an embodiment, the configuration of spring elements 44, 48, 50 of drive spring systems 36, 38, 40, 42 results in drive movement in which when drive masses 22, 26 (and correspondingly sense masses 68, 72) are driven to move along X-axis 100 toward central region 34, and hence toward one another in phase opposition, drive masses 24, 28 (and correspondingly sense masses 70, 74) are concurrently driven to move along Y-axis 102 away from central region 34, and hence away from one another in phase opposition. Of course, due to the oscillatory nature of the drive movement when drive masses 22, 26 (and correspondingly sense masses 68, 72) are driven to move along X-axis 100 away from central region 34, and hence away from one another in phase opposition, drive masses 24, 28 (and correspondingly sense masses 70, 74) are concurrently driven to move along Y-axis 102 toward central region 34, and hence toward one another in phase opposition. Thus drive masses 22, 26 move inward as drive masses 24, 28 move outward and vice versa.

Some prior art gyroscope designs call for drive movement in which the two pairs of drive masses move inwardly together and then outwardly together. These gyroscope designs can suffer from squeeze film damping. When two similar-shaped surfaces are close to each other and moving closer, and there is a gas or liquid between them, that gas or liquid has to flow out. Associated with that flow is viscosity, which means that some of the kinetic energy of the moving surfaces gets dissipated. This viscosity and the subsequent dissipation of kinetic energy is referred to as "damping." The term "squeeze film damping" refers to the damping effect associated with "squeezing" of the fluid (gas or liquid) layer. Of course, when the two surfaces move farther apart, the fluid has to rush into the expanding space between the surfaces. Squeeze film damping is highly nonlinear since the damping coefficient changes depending on how close the surfaces are and depending upon the compressibility of the gas. Accordingly, squeeze film damping can lead to sensor inaccuracy in gyroscope designs that call for drive movement in which the two pairs of drive masses move inwardly together and then outwardly together.

The drive movement of drive masses 22, 26 in opposition to drive masses 24, 28 results in significantly less squeeze film damping since as drive masses 22, 26 move outwardly, drive masses 24, 28 move inwardly and vice versa. Therefore, the gaps between drive masses 22, 24, 26, 28 remain generally the same, as does the fluid (e.g., gas) between them. A reduction in the damping source, i.e., squeeze film damping, can help MEMS gyroscope 20 achieve high performance with less requirements on vacuum level (e.g., lower bonding requirements, no getter, and so forth) which decreases complexity and cost of fabrication of MEMS gyroscope 20.

Furthermore, the drive movement of drive masses 22, 26 in opposition to drive masses 24, 28 can result in less potential energy conversion and therefore an intrinsically stable drive mode for MEMS gyroscope 20. In addition, implementation of a decoupling frame that includes drive masses 22, 24, 26, 28 interconnected via drive spring systems 36, 38, 40, 42 reduces mechanical coupling between functional elements of MEMS gyroscope 20, which achieves a cleaner mode spectrum. Consequently, a reduction of motion coupling between functional elements can result in a more robust MEMS gyroscope design that is less susceptible to external perturbations.

Due to the presence of drive spring systems 36, 38, 40, 42 interconnecting drive masses 22, 24, 26, 28, a single driving movement is sufficient to set in motion all of drive masses 22, 24, 26, 28, and the associated sense masses 68, 70, 72, and 74. A single drive mode can achieve savings in size and complexity for a multiple axis, and particularly a triaxial, MEMS gyroscope design. That is, it may be sufficient to couple fixed and movable drive electrodes 104, 106 to only one of the pairs of drive masses 22, 24, 26, 28, since the other pair of drive masses 22, 24, 26, 28 are set in motion due to the compliant drive spring systems 36, 38, 40, 42.

Figure 5:
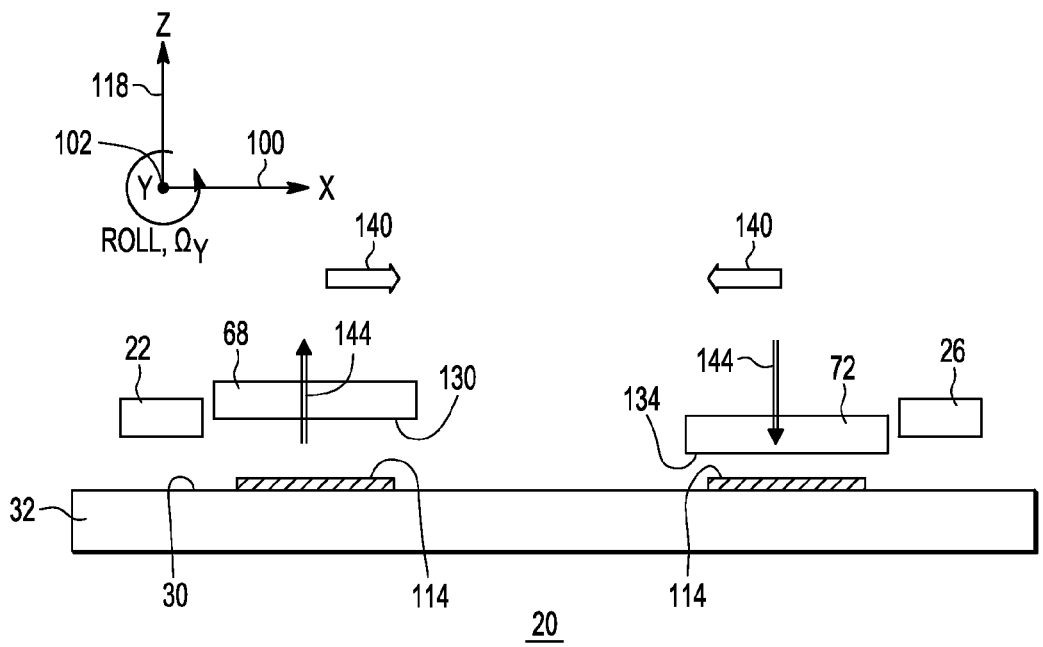
FIG. 5 shows a simplified side view of the MEMS gyroscope across section line 5-5 of FIG. 4 demonstrating roll sensing.

FIG. 5 shows a simplified side view of MEMS gyroscope 20 across section line 5-5 of FIG. 4 demonstrating roll sensing. When drive motion 140 is applied to drive masses 22, 26 and sense masses 68, 72, drive motion 140 generates a sense motion 144 of sense masses 68, 72 along Z-axis 118 in response to rotation of MEMS gyroscope 20 about Y-axis 102. Since sense masses 68, 72 are being driven in phase opposition, the resulting sense motion 144 of sense masses 68, 72 will also be in phase opposition. Sense motion 144 is transverse to surface 30 of substrate 32 and is translational such that planar surfaces 130 and 134 remain substantially parallel to surface 30 of substrate 32. The displacement of sense masses 68 and 72 may be detected as a change in capacitance at roll sense electrodes 114.

To summarize, when sense masses 68, 72 are being driven in phase opposition along X-axis 100, and MEMS gyroscope 20 experiences roll angular velocity 112 about Y-axis 102, drive motion 140 generates a "Coriolis force," i.e., sense motion 144. Sense motion 144 of sufficient magnitude causes displacement of sense masses 68 and 72 in a direction transverse to the direction of drive motion 140 (e.g., transverse to X-axis 100) and transverse to the axis about which the rotation occurs (e.g., transverse to Y-axis 102). The displacement of sense masses 68 and 72 is proportional to roll angular velocity 112 which may be detected as a change in capacitance at sense electrodes 114.

Figure 6:
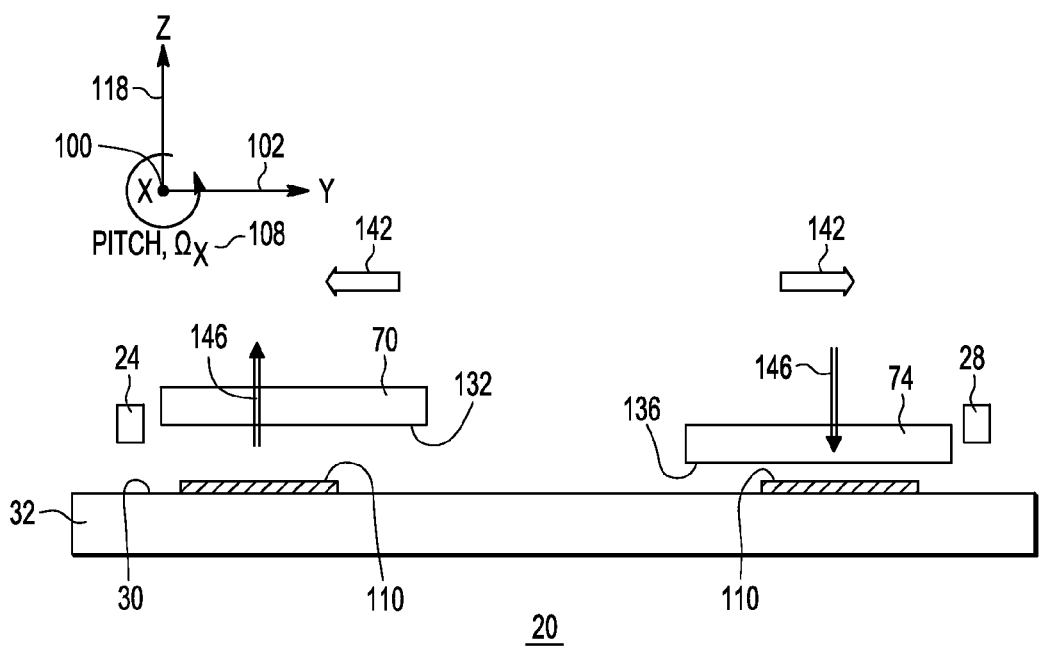
FIG. 6 shows a simplified side view of the MEMS gyroscope across section line 6-6 of FIG. 4 demonstrating pitch sensing.

FIG. 6 shows a simplified side view of MEMS gyroscope 20 across section line 6-6 of FIG. 4 demonstrating pitch sensing. When drive motion 142 is applied to drive masses 24, 28 and sense masses 70, 74, drive motion 142 generates a sense motion 146 of sense masses 70, 74 along Z-axis 118 in response to rotation of MEMS gyroscope 20 about X-axis 100. Since sense masses 70, 74 are being driven in phase opposition, the resulting sense motion 146 of sense masses 70, 74 will also be in phase opposition. Sense motion 146 is transverse to surface 30 of substrate 32 and is translational such that planar surfaces 132 and 136 remain substantially parallel to surface 30 of substrate 32. The displacement of sense masses 70 and 74 may be detected as a change in capacitance at pitch sense electrodes 110.

To summarize, when sense masses 70, 74 are being driven in phase opposition along Y-axis 100, and MEMS gyroscope 20 experiences pitch angular velocity 108 about X-axis 100, drive motion 142 generates a Coriolis force, i.e., sense motion 146. Sense motion 146 of sufficient magnitude causes displacement of sense masses 70 and 74 in a direction transverse to the direction of drive motion 142 (e.g., transverse to Y-axis 102) and transverse to the axis about which the rotation occurs (e.g., transverse to X-axis 100). The displacement of sense masses 70 and 74 is proportional to pitch angular velocity 108 which may be detected as a change in capacitance at sense electrodes 110.

In prior art gyroscope designs, the sense mass or sense masses typically tilt or tip about an axis of rotation in a teeter-totter fashion. A tilting sense mass gyroscope design can be less efficient compared to a gyroscope design having parallel plate movement. To achieve similar sensitivity in the tilting sense mass gyroscope to a parallel plate gyroscope calls for either lowering the operating frequency, a smaller sense gap, a smaller drive-sense frequency gap, a larger sense area, or some combination thereof. Unfortunately, lowering the device operating frequency increases device susceptibility to external disturbances such as acoustic noise, and limits the degree of miniaturization of the device since a smaller design tends to increase the operating frequency. A smaller sense gap can cause problems during processing because the tilting sense mass structure may repeatedly strike the underlying electrode during processing. This can result in abrasions to the electrode and/or the tilting sense mass structure which can therefore produce yield loss. Additionally, a relatively large electrostatic force may be generated with a tilting sense mass structure due to the small sense gap. A relatively large electrostatic force can result in a more severe frequency tuning effect which can, in turn, result in sensitivity shifting. A smaller drive-sense frequency gap can add to process difficulties and to other ASIC related issues, and a larger sense area can lead to a larger design which is counter to efforts at miniaturization.

In MEMS gyroscope 20, due to implementation of beam springs 76 (FIG. 1), parallel plate motion is produced in which sense masses 68, 70, 72, 74 remain substantially parallel to surface 32 of substrate 30 as they displace along Z-axis 118. Such a configuration advantageously produces improvements in sensitivity relative to a tilting sense mass structure, without the need for the small gap and the commensurate problems associated with a small sense gap. Accordingly, more efficient sensing can increase the sensitivity of MEMS gyroscope over prior art tilt motion structures without increasing the size of MEMS gyroscope. Furthermore, a reduction in yield loss during processing can be achieved.

Figure 7:
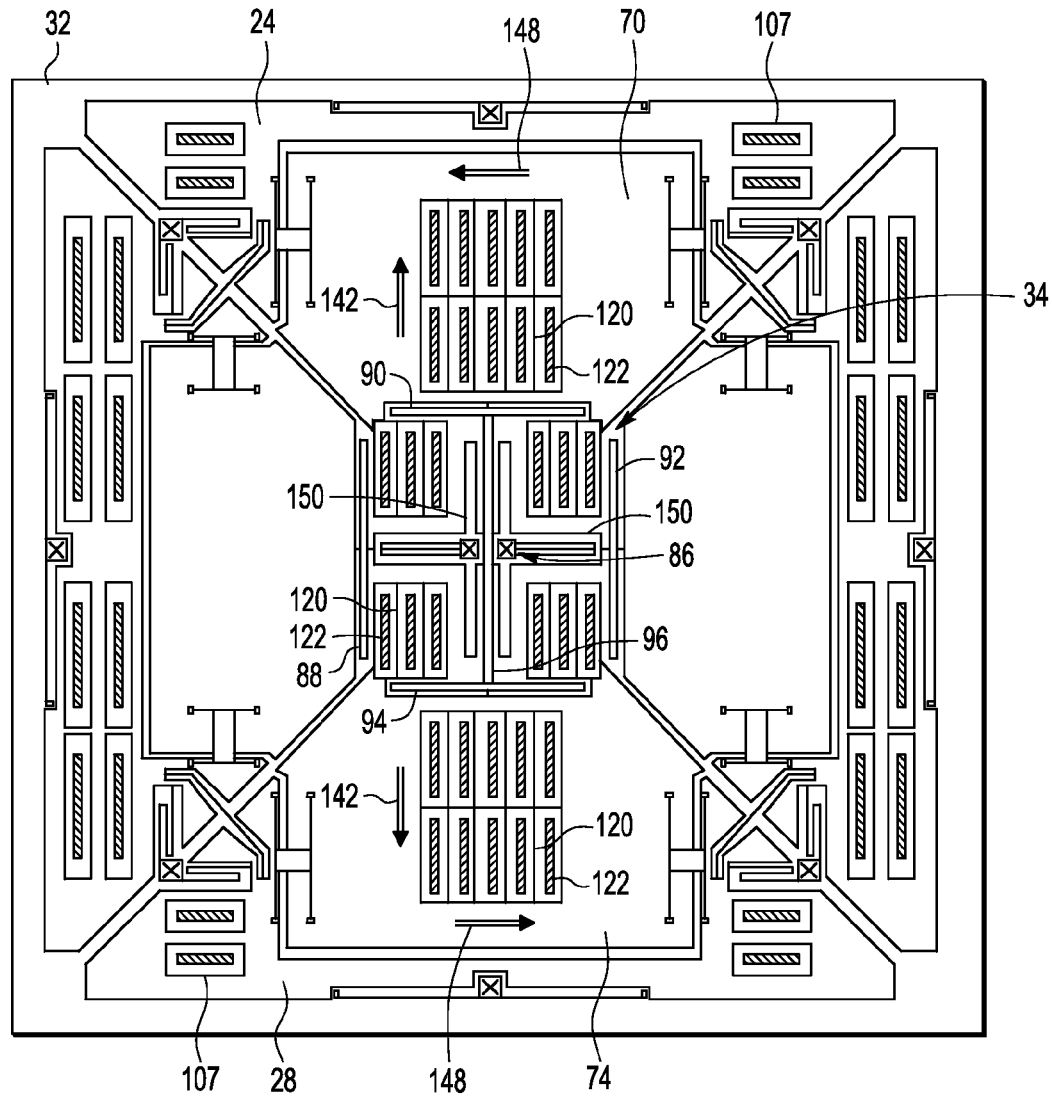
FIG. 7 shows a simplified top view of the MEMS gyroscope demonstrating yaw sensing.

FIG. 7 shows a simplified top view of MEMS gyroscope 20 demonstrating yaw sensing. When drive motion 142 is applied to drive masses 24, 28 and sense masses 70, 74, drive motion 142 generates a sense motion 148 of sense masses 70, 74 along X-axis 100 in response to rotation of MEMS gyroscope 20 about Z-axis 118. Since sense masses 70, 74 are being driven in phase opposition, the resulting sense motion 148 of sense masses 70, 74 will also be in phase opposition. Sense motion 148 is generally parallel to surface 30 of substrate 32 and is translational. The displacement of sense masses 70 and 74 may be detected as a change in capacitance between movable and fixed yaw sense electrodes 120 and 122.

Central region 34 includes anchor system 86, compliant members 88, 90, 92, 94, and rigid beam 96 that allow movements in phase opposition and inhibit in phase movements of pairs of sense masses, where sense masses 68, 72 form one pair and sense masses 70, 74 form the other pair. As mentioned briefly above, an end of rigid beam 96 is coupled to sense mass 70 via compliant member 90 and the opposing end of rigid beam 96 is coupled to sense mass 74 via compliant member 94. Rigid beam 96 is "hinged" to anchor system 86, and therefore to substrate 32, via hinge elements 150. Due to a suitable configuration of hinge elements 150, rigid beam 96 can rotate about a central point of constraint, i.e. approximately central to rigid beam 96, in an X-Y plane defined by X-axis 100 and Y-axis 102 in response to yaw angular velocity 116 about Z-axis 118. Accordingly, sense masses 70, 74 can translate in phase opposition along X-axis 100.

To summarize, when sense masses 70, 74 are being driven in phase opposition along Y-axis 100, and MEMS gyroscope 20 experiences yaw angular velocity 116 about Z-axis 118, drive motion 142 generates a Coriolis force, i.e., sense motion 148. Sense motion 148 of sufficient magnitude causes displacement of sense masses 70 and 74 in a direction transverse to the direction of drive motion 142 (e.g., transverse to Y-axis 102) and transverse to the axis about which the rotation occurs (e.g., transverse to Z-axis 118). The displacement of sense masses 70 and 74 is proportional to yaw angular velocity 116 which may be detected as a change in capacitance between movable and fixed yaw sense electrodes 120 and 122.

Thus, as demonstrated in connection with FIGS. 5-7, MEMS gyroscope 20 is capable of sensing angular velocities about three axes of a Cartesian reference system that is fixed with respect to MEMS gyroscope 20.

Figure 8:
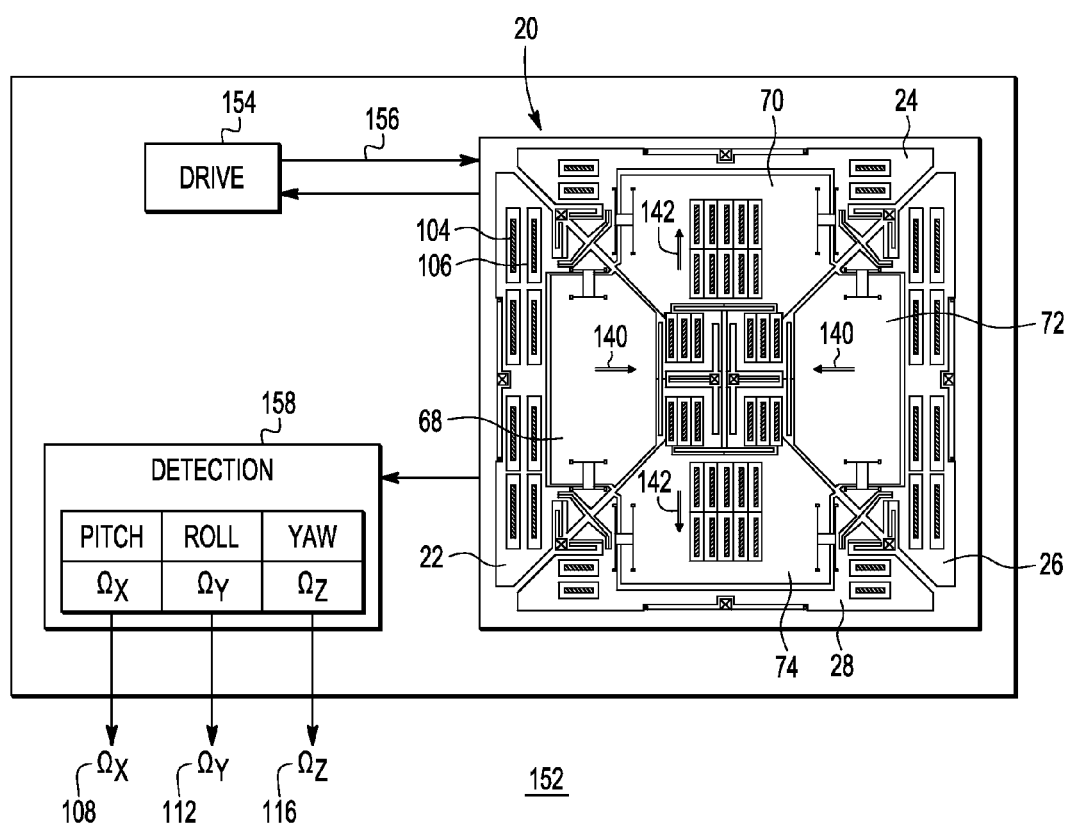
FIG. 8 shows a simplified block diagram of an electronic device that includes the MEMS gyroscope.

FIG. 8 shows a simplified block diagram of an electronic device 152 that includes MEMS gyroscope 20. Electronic device 152 may be implemented in a plurality of electronic systems such as inertial navigation systems, automotive systems, or portable devices such as game controllers, cell phones, portable computers, digital audio players, cameras, and so forth. Electronic device 152 may be able to process, store, transmit, and receive signals and information. In the illustrative embodiment, electronic device includes a drive circuit 154 configured to impart the drive motion on drive masses 22, 24, 26, 28. For example, a drive signal 156 may be supplied to fixed drive electrodes 104 by drive circuit 154 in a known manner to cause drive motion 140 of drive masses 22, 26 and drive motion 142 of drive masses 24, 28 as discussed above. Electronic device may further include a detection circuit 158 operatively coupled to sense electrodes 110, 114, 122 (FIG. 1) associated with sense masses 68, 70, 72, 74. Detection circuit 158 may be configured to detect the magnitude of displacement of sense masses 68, 70, 72, 74, and determine pitch, roll, and yaw angular velocities 108, 112, 116, and subsequently output pitch, roll, and yaw angular velocities 108, 112, 116.

Accordingly as described in detail above, an embodiment of a MEMS gyroscope includes a first drive mass configured to be driven in a first drive motion along a first axis and a second drive mass configured to be driven in a second drive motion along a second axis that is transverse to the first axis, each of the first and second axes being parallel to a surface of a substrate. A drive spring system interconnects the first drive mass with the second drive mass to couple the first drive motion to the second drive motion. A first sense mass is coupled to the first drive mass such that the first drive motion generates first sense motion of the first sense mass along a third axis in response to rotation of the MEMS gyroscope. The third axis is transverse to each of the first and second axes, and the first sense motion is translational motion such that a first planar surface of the first sense mass remains substantially parallel to the surface of the substrate. A second sense mass is coupled to the second drive mass such that the second drive motion generates second sense motion of the second sense mass along the third axis in response to rotation of the MEMS gyroscope. The second sense motion is translational motion such that a second planar surface of the second sense mass remains substantially parallel to the surface of the substrate.

In addition, an embodiment of a method of forming a MEMS gyroscope includes forming a first drive mass and a first sense mass coupled to the first drive mass, the first drive mass configured to be driven in a first drive motion along a first axis. The method further includes forming a second drive mass and a second sense mass coupled to the second drive mass, the second drive mass configured to be driven in a second drive motion along a second axis that is transverse to the first axis, the first and second axes being parallel to a surface of a substrate. A drive spring system is formed interconnecting the first drive mass with the second drive mass to couple the first drive motion to the second drive motion. The first drive motion generates first sense motion of the first sense mass along a third axis in response to rotation of the MEMS gyroscope, the third axis being transverse to each of the first and second axes, and the first sense motion being translational motion such that a first planar surface of the first sense mass remains substantially parallel to the surface of the substrate. The second drive motion generates second sense motion of the second sense mass along the third axis in response to rotation of the MEMS gyroscope, the second sense motion being translational motion such that a second planar surface of the second sense mass remains substantially parallel to the surface of the substrate.

Embodiments described herein entail a microelectromechanical systems (MEMS) gyroscope having a single drive mode design in a multiple sense axis configuration and a method for fabricating the MEMS gyroscope. The single drive mode can reduce the footprint for a multiple sense axis gyroscope. Additionally, the single drive mode can reduce the complexity of the associated application specific integrated circuit (ASIC) containing the electronic drive circuit to yield a lower power consumption and smaller ASIC design. Furthermore, the single drive mode design has intrinsically less damping which can yield high device performance with lower requirements on vacuum levels (lower bonding requirement, no getter, and so forth), therefore simplifying fabrication. The MEMS gyroscope implements the single drive mode combined with a drive spring system that reduces motion coupling between the functional elements to achieve a robust device that is less susceptible to external perturbations. Furthermore, the MEMS gyroscope has more efficient sense capability which can increase the sensitivity of the device without increasing the device size. The MEMS gyroscope also has more efficient sense capability which can increase the sensitivity of the device without increasing the device size.

The foregoing description of specific embodiments reveals the general nature of the inventive subject matter sufficiently so that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims. For example, the drive mass and/or sense mass can have different shapes, such as circular rings, disks, rectangles, and the like. In addition, the drive mass and sense mass may be arranged differently from that which is shown. Additionally, drive electrodes may be associated with both pairs of drive masses and/or fixed sense electrodes for yaw angular velocity sensing may be associated with both pairs of drive masses. Accordingly, it should be appreciated that the exemplary embodiments are only examples, and are not intended to limit the scope, applicability, or configuration of the invention.

What is claimed is:

1. A MEMS gyroscope comprising:
   a first drive mass configured to be driven in a first drive motion along a first axis;
   a second drive mass configured to be driven in a second drive motion along a second axis that is transverse to said first axis, each of said first and second axes being parallel to a surface of a substrate;
   a drive spring system interconnecting said first drive mass with said second drive mass to couple said first drive motion to said second drive motion, said drive spring system including a first spring element coupled to each of said first drive mass and said second drive mass, an anchor element coupled to said substrate, a second spring element interconnected between said first drive mass and said anchor element, and a third spring element interconnected between said second drive mass and said anchor element, wherein said first spring element is directly physically coupled to each of said first and second drive masses without an intervening interconnection to either of said second and third spring elements;
   a first sense mass coupled to said first drive mass such that said first drive motion generates first sense motion of said first sense mass along a third axis in response to rotation of said MEMS gyroscope, said third axis being transverse to each of said first and second axes, said first sense motion being translational motion such that a first planar surface of said first sense mass remains substantially parallel to said surface of said substrate; and
   a second sense mass coupled to said second drive mass such that said second drive motion generates second sense motion of said second sense mass along third axis in response to rotation of said MEMS gyroscope, said second sense motion being translational motion such that a second planar surface of said second sense mass remains substantially parallel to said surface of said substrate.

2. A MEMS gyroscope as claimed in claim 1 wherein said drive spring system is a first drive spring system, and said MEMS gyroscope further comprises:
   a third drive mass configured to be driven in said first drive motion along said first axis;
   a fourth drive mass configured to be driven in said second drive motion along said second axis;
   a second drive spring system interconnecting said second drive mass with said third drive mass;
   a third drive spring system interconnecting said third drive mass with said fourth drive mass; and
   a fourth drive spring system interconnecting said fourth drive mass with said first drive mass.

3. A MEMS gyroscope as claimed in claim 2 wherein:
   said first, second, third, and fourth drive masses are uniformly arranged about a central region; and
   said MEMS gyroscope further comprises a drive assembly configured to impart said first drive motion on said first drive mass such that when said first and third drive masses are driven to move along said first axis toward said central region, said second and fourth drive masses concurrently move along said second axis away from said central region.

4. A MEMS gyroscope as claimed in claim 2 further comprising:
   a third sense mass coupled to said third drive mass such that said first drive motion generates said first sense motion of said third sense mass along said third axis in response to rotation of said MEMS gyroscope;
   a fourth sense mass coupled to said fourth drive mass such that said second drive motion generates said second sense motion of said fourth sense mass along said third axis in response to rotation of said MEMS gyroscope;
   an anchor system coupled to said substrate with said first, second, third, and fourth sense masses being arranged around said anchor system; and
   compliant members, wherein each of said first, second, third, and fourth sense masses are coupled to said anchor system via said compliant members.

5. A MEMS gyroscope as claimed in claim 4 wherein:
   first ones of said compliant members are interconnected between each of said first and third sense masses and said anchor system, said first ones of said compliant members enabling said first sense motion of said first and third sense masses in phase opposition; and
   second ones of said compliant members are interconnected between each of said second and fourth sense masses and said anchor system, said second ones of said compliant members enabling said second sense motion of said second and fourth sense masses in said phase opposition.

6. A MEMS gyroscope as claimed in claim 1 further comprising multiple beam springs, wherein a first pair of said beam springs interconnects said first sense mass with said first drive mass and a second pair of said beam springs interconnects said second sense mass with said second drive mass.

7. A MEMS gyroscope as claimed in claim 6 wherein each of said multiple beam springs comprises:
   a first compliant end;
   a second compliant end, each of said first and second compliant ends being configured to tilt out of a plane perpendicular to said surface of said substrate; and a beam section spanning between said first and second compliant ends, said beam section being rigid relative to said first and second compliant ends.

8. A MEMS gyroscope as claimed in claim 6 wherein:
each of said beam springs includes a beam section having a longitudinal axis;
said beam springs of said first pair of said beam springs are located on opposing edges of said first sense mass with said longitudinal axis of each said beam section of said each beam spring of said first pair being aligned with one another; and
said beam springs of said second pair of said beam springs are located on opposing edges of said second sense mass with said longitudinal axis of each said beam section of said each beam spring of said second pair being aligned with one another.

9. A MEMS gyroscope as claimed in claim 6 wherein:
said beam springs of said first pair of said beam springs are positioned to cooperatively retain said first sense mass in balance at a first center of gravity of said first sense mass; and
said beam springs of said second pair of said beam springs are positioned to cooperatively retain said second sense mass in balance at a second center of gravity of said second sense mass.

10. A MEMS gyroscope as claimed in claim 9 further comprising:
an anchor system coupled to said surface of said substrate;
a first compliant member interconnected between said first sense mass and said anchor system, wherein said first compliant member along with said beam springs of said first pair of said beam springs are positioned to retain said first sense mass in said balance at said first center of gravity; and
a second compliant member interconnected between said second sense mass and said anchor system, wherein said second compliant member along with said beam springs of said second pair of said beam springs are positioned to retain said second sense mass in said balance at said second center of gravity.

11. A MEMS gyroscope as claimed in claim 1 wherein:
said first drive motion is configured to generate said first sense motion along said third axis in response to rotation of said MEMS gyroscope about said second axis;
said second drive motion is configured to generate said second sense motion along said third axis in response to rotation of said MEMS gyroscope about said first axis; and
said first drive motion is configured to generate a third sense motion of one of said first and second sense masses in response to rotation of said MEMS gyroscope about said third axis.

12. A MEMS gyroscope comprising:
a first drive mass configured to be driven in a first drive motion along a first axis;
a second drive mass configured to be driven in a second drive motion along a second axis that is transverse to said first axis, each of said first and second axes being parallel to a surface of a substrate;
a drive spring system interconnecting said first drive mass with said second drive mass to couple said first drive motion to said second drive motion, said drive spring system including a first spring element coupled to each of said first drive mass and said second drive mass, an anchor element coupled to said substrate, a second spring element interconnected between said first drive mass and said anchor element, and a third spring element interconnected between said second drive mass and said anchor element, wherein said first spring element is directly physically coupled to each of said first and second drive masses without an intervening interconnection to either of said second and third spring elements;
a first sense mass;
a second sense mass;
a first pair of beam springs coupling said first sense mass to said second drive mass such that said first drive motion generates first sense motion of said first sense mass along a third axis in response to rotation of said MEMS gyroscope, said third axis being transverse to each of said first and second axes, said first sense motion being translational motion such that a first planar surface of said first sense mass remains substantially parallel to said surface of said substrate; and
a second pair of beam springs coupling said second sense mass to said second drive mass such that such that said second drive motion generates second sense motion of said second sense mass along said third axis in response to rotation of said MEMS gyroscope, said second sense motion being translational motion such that a second planar surface of said second sense mass remains substantially parallel to said surface of said substrate.

13. A MEMS gyroscope as claimed in claim 12 wherein each of said beam springs of said first and second pairs of beam springs comprises:
a first compliant end;
a second compliant end, each of said first and second compliant ends being configured to tilt out of a plane perpendicular to said surface of said substrate; and
a beam section spanning between said first and second compliant ends, said beam section being rigid relative to said first and second compliant ends.

14. A MEMS gyroscope as claimed in claim 12 wherein
said beam springs of said first pair of said beam springs are positioned to cooperatively retain said first sense mass in balance at a first center of gravity of said first sense mass; and
said beam springs of said second pair of said beam springs are positioned to cooperatively retain said second sense mass in balance at a second center of gravity of said second sense mass.

15. A MEMS gyroscope as claimed in claim 12 wherein said drive spring system is a first drive spring system, and said MEMS gyroscope further comprises:
a third drive mass configured to be driven in said first drive motion along said first axis;
a fourth drive mass configured to be driven in said second drive motion along said second axis;
a second drive spring system interconnecting said second drive mass with said third drive mass;
a third drive spring system interconnecting said third drive mass with said fourth drive mass; and
a fourth drive spring system interconnecting said fourth drive mass with said first drive mass.

16. A method of forming a MEMS gyroscope comprising:
forming a first drive mass and a first sense mass coupled to said first drive mass, said first drive mass configured to be driven in a first drive motion along a first axis;
forming a second drive mass and a second sense mass coupled to said second drive mass, said second drive mass configured to be driven in a second drive motion along a second axis that is transverse to said first axis, said first and second axes being parallel to a surface of a substrate;

forming a drive spring system interconnecting said first drive mass with said second drive mass to couple said first drive motion to said second drive motion, said drive spring system including a first spring element coupled to each of said first drive mass and said second drive mass, an anchor element coupled to said substrate, a second spring element interconnected between said first drive mass and said anchor element, and a third spring element interconnected between said second drive mass and said anchor element, wherein said first spring element is directly physically coupled to each of said first and second drive masses without an intervening interconnection to either of said second and third spring elements, wherein:

said first drive motion generates first sense motion of said first sense mass along a third axis in response to rotation of said MEMS gyroscope, said third axis being transverse to each of said first and second axes, said first sense motion being translational motion such that a first planar surface of said first sense mass remains substantially parallel to said surface of said substrate; and said second drive motion generates second sense motion of said second sense mass along said third axis in response to rotation of said MEMS gyroscope, said second sense motion being translational motion such that a second planar surface of said second sense mass remains substantially parallel to said surface of said substrate.

17. A method as claimed in claim 16 wherein said drive spring system is a first drive spring system, and said method further comprises:

forming a third drive mass and a third sense mass coupled to said third drive mass, said third drive mass configured to be driven in said first drive motion along said first axis;

forming a fourth drive mass and a fourth sense mass coupled to said fourth drive mass, said fourth drive mass configured to be driven in said second drive motion along said second axis;

forming a second drive spring system interconnecting said second drive mass with said third drive mass;

forming a third drive spring system interconnecting said third drive mass with said fourth drive mass; and forming a fourth drive spring system interconnecting said fourth drive mass with said first drive mass, wherein:

said first drive motion additionally generates said first sense motion of said third sense mass along said third axis in response to rotation of said MEMS gyroscope; and said second drive motion additionally generates said second sense motion of said fourth sense mass along said third axis in response to rotation of said MEMS gyroscope.

18. A method as claimed in claim 17 further comprising:

uniformly arranging said first, second, third, and fourth drive masses about a central region; and forming a drive assembly configured to impart said first drive motion on said first drive mass such that when said first and third drive masses are driven to move along said first axis toward said central region, said second and fourth drive masses concurrently move along said second axis away from said central region.

19. A method as claimed in claim 16 wherein:

said first drive motion is configured to generate said first sense motion along said third axis in response to rotation of said MEMS gyroscope about said second axis;

said second drive motion is configured to generate said second sense motion along said third axis in response to rotation of said MEMS gyroscope about said first axis; and said first drive motion is configured to generate a third sense motion of one of said first and second sense masses in response to rotation of said MEMS gyroscope about said third axis.

\* \* \* \* \*